United States Patent
Saleh et al.

(10) Patent No.: US 10,850,253 B2
(45) Date of Patent: *Dec. 1, 2020

(54) METHOD FOR REMOVING DISSOLVED HEAVY METALS FROM LIQUIDS

(71) Applicant: KING FAHD UNIVERSITY OF PETROLEUM AND MINERALS, Dhahran (SA)

(72) Inventors: Tawfik Abdo Saleh, Dhahran (SA); Ahmed Salem Aljameel, Dhahran (SA)

(73) Assignee: King Fahd University of Petroleum and Minerals, Dhahran (SA)

(*) Notice: Subject to any disclaimer, the term of this patent is extended or adjusted under 35 U.S.C. 154(b) by 25 days.

This patent is subject to a terminal disclaimer.

(21) Appl. No.: 16/180,736

(22) Filed: Nov. 5, 2018

(65) Prior Publication Data

US 2019/0070582 A1  Mar. 7, 2019

Related U.S. Application Data

(63) Continuation of application No. 15/614,201, filed on Jun. 5, 2017, now Pat. No. 10,150,094.

(Continued)

(51) Int. Cl.
*B01J 20/02* (2006.01)
*B01J 20/20* (2006.01)
(Continued)

(52) U.S. Cl.
CPC ......... *B01J 20/0233* (2013.01); *B01J 20/205* (2013.01); *B01J 20/264* (2013.01);
(Continued)

(58) Field of Classification Search
CPC ............ B01J 20/0233; B01J 20/205; B01J 20/28059; B01J 20/264; C08K 3/042;
(Continued)

(56) References Cited

U.S. PATENT DOCUMENTS

2013/0072613 A1  3/2013  Miltner et al.
2013/0105400 A1  5/2013  Lee et al.
(Continued)

FOREIGN PATENT DOCUMENTS

KR  10-2011-0073296 A  6/2011
WO  WO 2016/191802 A1  12/2016
WO  WO 2017/015648 A1  1/2017

OTHER PUBLICATIONS

Saleh, T.A., et et al., "Effective Adsorption of Antimony(III) from Aqueous Solutions by Polyamide-Graphene Composite as a Novel Adsorbent", Chemical Engineering Journal, vol. 307, 1 page total, (Jan. 1. 2017) (Abstract only).
(Continued)

*Primary Examiner* — Anthony J Zimmer
(74) *Attorney, Agent, or Firm* — Oblon, McClelland, Maier & Neustadt, L.L.P.

(57) ABSTRACT

A metal adsorbent that includes silver-decorated graphene nano-platelets and a polymer matrix that comprises polyamide, wherein the metal adsorbent is a highly porous material with a specific surface area of 200 to 300 m²/g and an average pore size of 50 to 100 Å, which effective removes heavy metals and cations from a liquid. Various embodiments of the metal adsorbent and a method of making thereof are also provided.

2 Claims, 11 Drawing Sheets

Related U.S. Application Data

(60) Provisional application No. 62/347,802, filed on Jun. 9, 2016.

(51) Int. Cl.
*B01J 20/26* (2006.01)
*B01J 20/28* (2006.01)
*C08L 77/10* (2006.01)
*C08K 3/04* (2006.01)
*C08K 3/08* (2006.01)
*C08G 69/32* (2006.01)

(52) U.S. Cl.
CPC ......... *B01J 20/28059* (2013.01); *C08K 3/042* (2017.05); *C08L 77/10* (2013.01); *C08G 69/32* (2013.01); *C08K 3/08* (2013.01); *C08K 2003/0806* (2013.01); *C08K 2201/003* (2013.01); *C08K 2201/011* (2013.01); *C08K 2201/016* (2013.01); *C08L 2205/22* (2013.01)

(58) Field of Classification Search
CPC ... C08K 3/08; C08K 2003/0806; C08L 77/10; C08L 2666/55; C08L 2205/22; C08G 69/32
See application file for complete search history.

(56) References Cited

U.S. PATENT DOCUMENTS

2013/0240439 A1    9/2013   Pradeep et al.
2016/0038885 A1    2/2016   Hogen-Esch et al.
2017/0065762 A1    3/2017   Larsen et al.

OTHER PUBLICATIONS

Jiao, T., et al., "Reduced Graphene Oxide-Based Silver Nanoparticle-Containing Composite Hydrogel as Highly Efficient Dye Catalysts for Wastewater Treatment", Scientific Reports, 12 pages total, (Jul. 17. 2015).

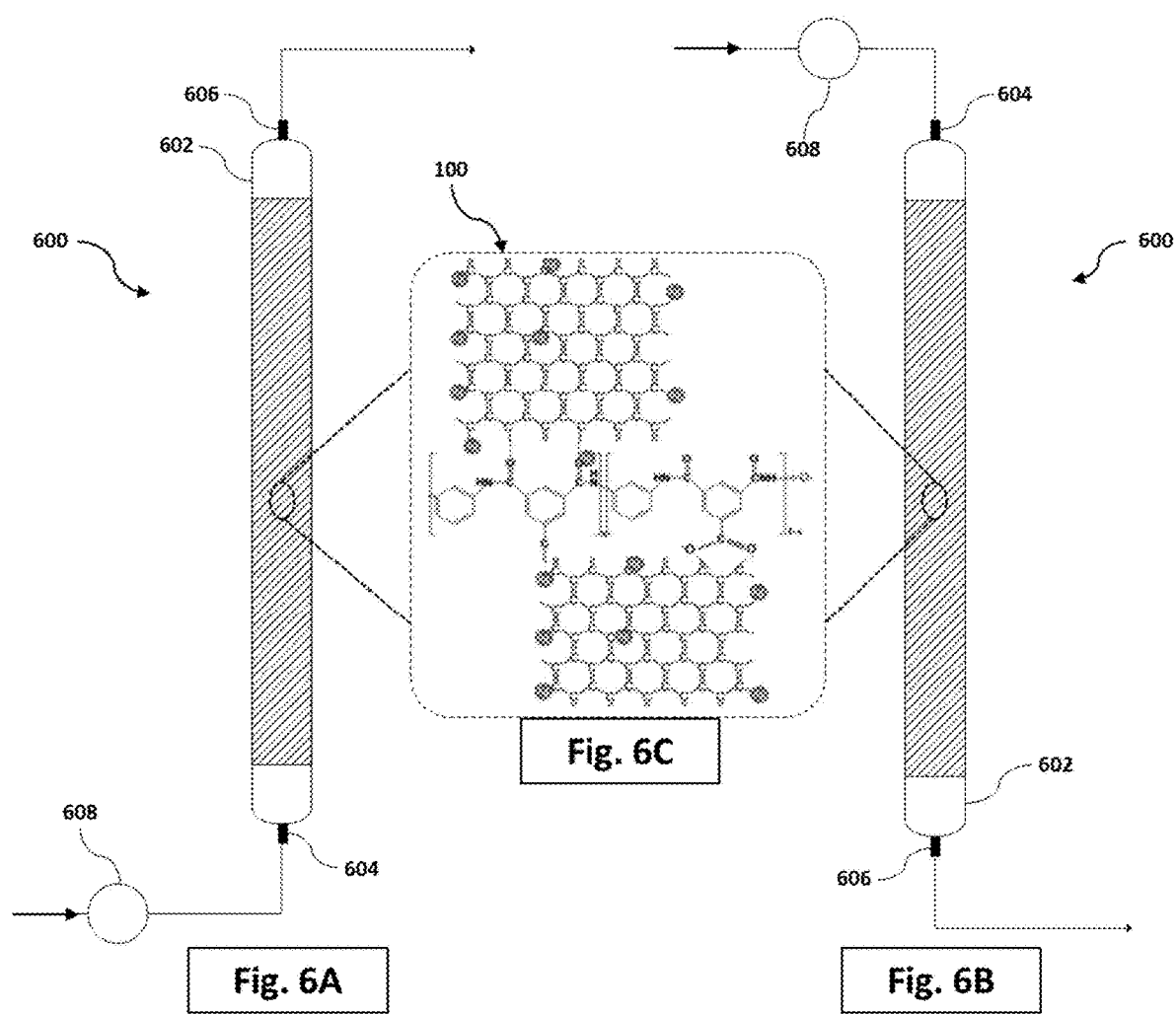

METHOD FOR REMOVING DISSOLVED HEAVY METALS FROM LIQUIDS

CROSS REFERENCE TO RELATED APPLICATIONS

This present application is a Continuation of Ser. No. 15/614,201, now allowed, having a filing date of Jun. 5, 2017 and which claims the benefit of priority to U.S. provisional application No. 62/347,802 having a filed date of Jun. 9, 2016, the entire contents of which are incorporated herein by reference.

STATEMENT OF FUNDING ACKNOWLEDGEMENT

The funding support provided by Chemistry Department of King Fahd University of Petroleum & Minerals (KFUPM) is gratefully acknowledged.

BACKGROUND OF THE INVENTION

Technical Field

The present invention relates to a metal adsorbent that includes silver-decorated graphene nano-platelets and a polymer matrix that comprises polyamide.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water pollution has become a worldwide major problem that impacts the environment, the ecosystem, and human life. The impact of water pollution has gone beyond environment and human health to economy in a society. Accordingly, finding a solution for effectively controlling and managing water pollution is important, One of the emerging technologies in water filtration and purification is the use of nanoparticles for effective removal of metal elements, ions, and toxic compounds present in 5 water. The unique characteristic of nanoparticles, i.e. the significantly large surface area, makes a widespread use of nanoparticles in water purification technologies, particularly for removal of heavy metals from contaminated water [Saleh, T., Haladu, S., & Ali, S. (2015). A novel cross-linked pH-responsive tetrapolymer: Synthesis, characterization and sorption evaluation towards Cr(III). Chemical Engineering Journal, 269, 9-19; Yang, 13., Liu, Z., Guo, Z., Zhang, Wan, M., Qin, X., & Zhong, H. (2014), In situ green synthesis of silver-graphene oxide nanocomposites by using tryptophan as a reducing and stabilizing agent and their application m SERS, Applied Surface Science, 316, 22-27]. One group of materials that have already been widely used for water purification systems and membranes are ceramic nanoparticles such as alumina ($Al_2O_3$), titania ($TiO_2$), zirconia ($ZrO_2$), and silica ($SiO_2$) for microfiltration (MF) and ultrafiltration (UF) of water [Li, K. (2007). Ceramic Membranes for Separation and Reaction; John Wiley & Sons, Ltd.: Chichester, UK, p. 306; Weber, R.; Chmiel, H.; Mavrov, V. (2003), Characteristics and application of new ceramic nanofiltration membranes. Desalination, 15 7, 113-125].

However, membranes made of ceramic nanoparticles are more expensive and more brittle than membranes made of polymers [Funk, C.V., Lloyd, D.R. (2008), Zeolite-filled microporous mixed matrix (ZeoTIPS) membranes: Prediction of gas separation performance. J. Membr. Sci., 313, 224-231].

Polymer-based membranes are cost-effective, flexible and thus are widely used in water purification units [Lai C. Y., Groth A., Gray S. and Duke M., (2014), Nanocomposites for Improved Physical Durability of Porous PVDF Membranes, Membranes, 4(1), 55-78]. However, drawbacks such as membrane fouling [Saleh, T., & Gupta, V., 2016, Nanomaterial and Polymer Membranes: Synthesis, Characterization, and Applications, $1^{st}$ Edition, Elsevier, 2016, Book ISBN: 9780128047033], organic fouling, inorganic fouling, and biofouling [Strathmann, H., Giorno, L., Drioli, E, An Introduction to Membrane Science and Technology; Wiley: Rome, Italy, 2011] substantially limit their usage as water filter membranes.

In view of the forgoing, one objective of the present invention is to provide a metal adsorbent that includes silver-decorated graphene nano-platelets and a polymer matrix that comprises polyamide. The metal adsorbent is a highly porous material with a specific surface area of 200 to 300 $m^2/g$ and an average pore size of 50 to 100 Å, which effectively removes heavy metals and cations from a liquid. Another objective of the present invention relates to a method of making the metal adsorbent.

BRIEF SUMMARY OF THE INVENTION

According to a first aspect, the present disclosure relates to a metal adsorbent, including i) a polymer matrix comprising a polyamide, ii) silver-decorated graphene nano-platelets that are dispersed in the polymer matrix, wherein the polyamide comprises reacted units of an aromatic amine and an acyl halide.

In one embodiment, the aromatic amine is an aromatic diamine and the acyl halide is a tri-acyl chloride.

In one embodiment, the aromatic amine is phenylenediamine and the acyl halide is trimesoyl chloride.

In one embodiment, the polyamide is a linear polymer.

In one embodiment, the polyamide is a crosslinked polymer.

In one embodiment, the silver-decorated graphene nano-platelets comprise graphene nano-platelets with silver nanoparticles deposited thereon.

In one embodiment, the graphene nano-platelets have an average thickness in the range of 1 to 20 nm, and an average diameter in the range of 0.5 to 100 μm.

In one embodiment, the silver nanoparticles have an average diameter in the range of 1 to 100 nm, In one embodiment, a volume ratio of the silver-decorated graphene nano-platelets to the polymer matrix is in the range of 2:1 to 1:5.

In one embodiment, the silver-decorated graphene nano-platelets are not chemically bonded to the polymer matrix.

In one embodiment, the metal adsorbent has a specific surface area of 200 to 300 $m^2/g$.

In one embodiment, the metal adsorbent has an average pore size of 50 to 100 Å.

According to a second aspect, the present disclosure relates to a method of making the metal adsorbent, involving i) mixing the silver-decorated graphene nano-platelets with the aromatic amine and water to form a suspension, ii) separately dissolving the acyl halide in an organic solvent to form an acyl halide solution, in mixing the acyl halide solution with the suspension and heating to form the metal adsorbent.

In one embodiment, the method further involves drying the metal adsorbent for at least 10 hours but no more than 24 hours, in a temperature of 50 to 70° C.

In one embodiment, a weight ratio of the silver-decorated graphene nano-platelets to 20 the aromatic amine in the suspension is in the range of 2:1 to 1:4.

In one embodiment, an amount of the aromatic amine per liter of the suspension i.s in the range of 5 to 15 g, and an amount of the acyl halide per liter of the acyl halide solution is in the range of 0.5 to 1.5 g.

In one embodiment, the method further involves i) mixing an aqueous silver solution with graphene nano-platelets and sonicating to foi in a first suspension, ii) mixing the first suspension with a stabilizing agent to fowl silver-decorated graphene nano-platelets in the first suspension, wherein silver nanoparticles are deposited on the graphene nano-platelets, iii) centrifuging the first suspension to remove the silver-decorated graphene nano-platelets prior to mixing the silver-decorated graphene nano-platelets with the aromatic amine.

According to a third aspect, the present disclosure relates to a filtration system, including i) a vessel with an internal cavity, a liquid inlet, and a liquid outlet, ii) the metal adsorbent disposed inside the internal cavity, wherein the filtration system is configured to adsorb at least a portion of one or more heavy metals from a liquid.

According to a fourth aspect, the present disclosure relates to a method of reducing a heavy metal content of a liquid, involving contacting the liquid with the metal adsorbent to adsorb at least a portion of one or more heavy metals onto the metal adsorbent, wherein said heavy metals are at least one selected from the group consisting of mercury, chromium, cadmium, lead, nickel, copper, and cations thereof.

In one embodiment, the liquid is passed through the metal adsorbent in a continuous fashion.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6A is a schematic of a filtration system with a liquid inlet located proximal to a bottom of a vessel and a liquid outlet located proximal to a top of the vessel.

FIG. 6B is a schematic of the filtration system with the liquid inlet located proximal to the bottom of the vessel and the liquid outlet located proximal to the top of the vessel.

FIG. 6C is a schematic representation of the metal adsorbent present in the filtration system.

DETAILED DESCRIPTION OF THE EMBODIMENTS

Figure 1A:
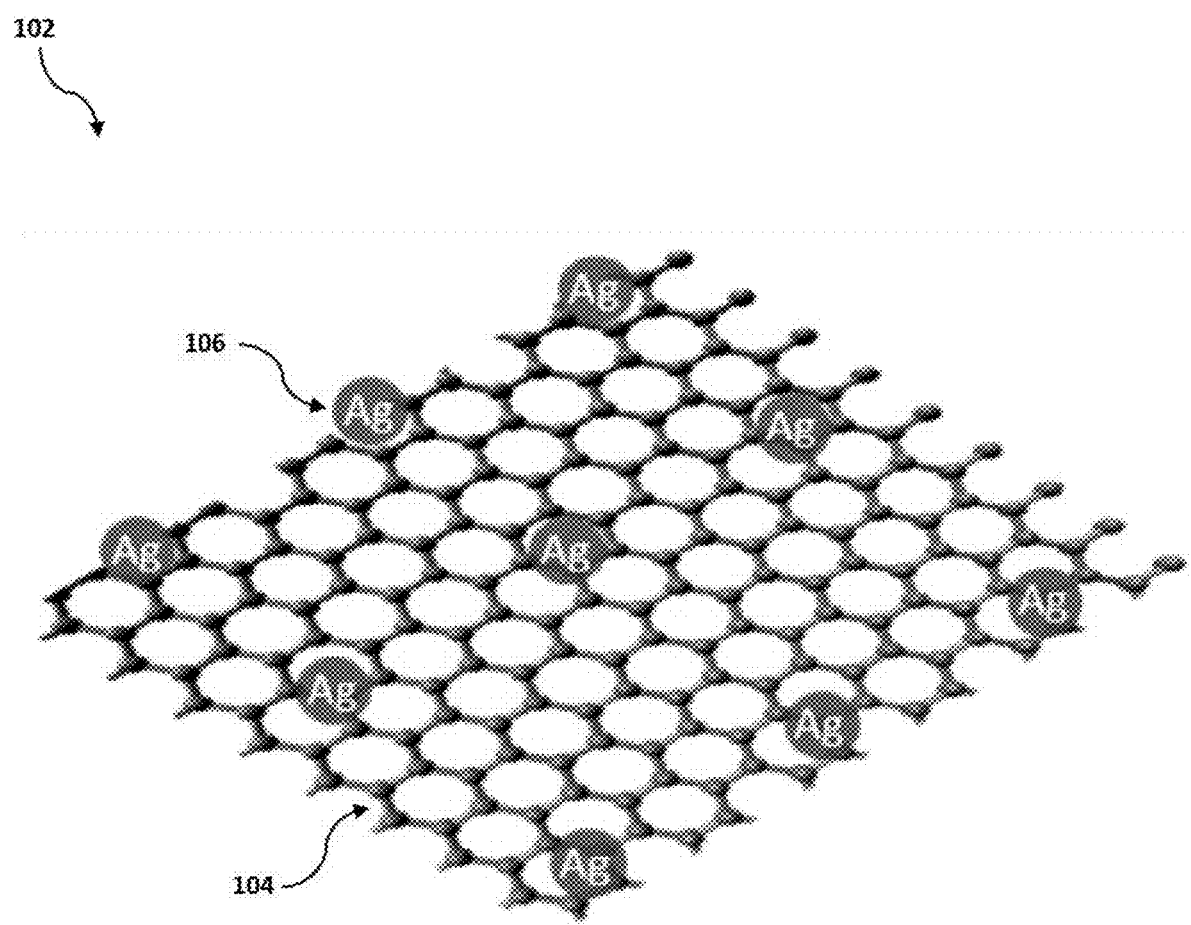
FIG. 1A is a schematic of a silver-decorated graphene nano-platelet.

Referring now to the drawings, wherein like reference numerals designate identical or corresponding parts throughout the several views.

According to a first aspect, the present disclosure relates to a metal adsorbent 100. The term "metal adsorbent" as used herein refers to a porous composition that is configured to adsorb at least one or more heavy metals selected from the group consisting of mercury, chromium, cadmium, lead, nickel, copper, and cations thereof. Accordingly, the metal adsorbent 100 includes silver-decorated graphene nano-platelets 102 that are dispersed in a polymer matrix 108.

Figure 2A:
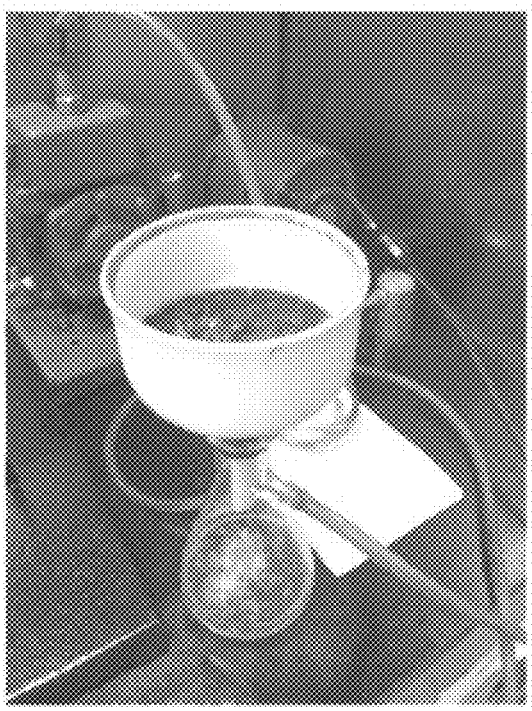
FIG. 2A is a picture of the metal adsorbent during washing with an organic solvent.
Figure 2B:
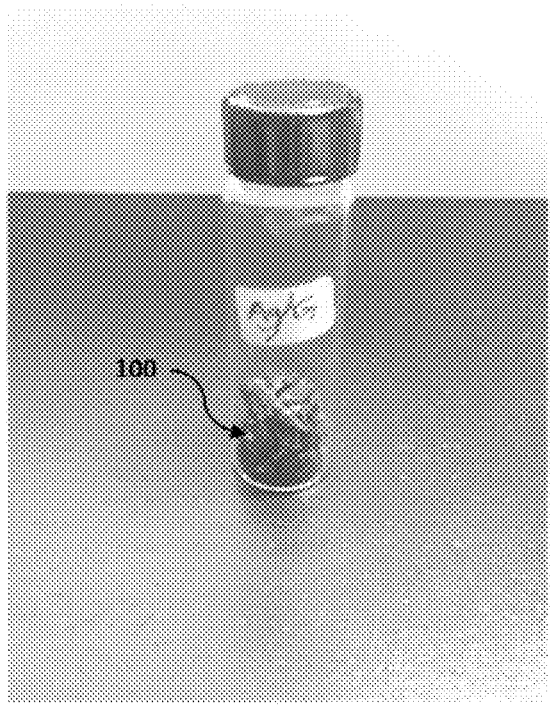
FIG. 2B is a picture of the metal adsorbent.

In a preferred embodiment, the polymer matrix 108 is utilized as a binder for the silver-decorated graphene nano-platelets 102, where the polymer matrix 108 may interact with the silver-decorated graphene nano-platelets 102 through Van der Waals interactions for example, to form an aggregate of silver-decorated graphene nano-platelets as the metal adsorbent 100, as shown in FIG. 2B. In view of that, a volume ratio of the silver-decorated graphene nano-platelets 102 to the polymer matrix 108 is in the range of 2:1 to 1:5, preferably 1.5:1 to 1:1.5, preferably about 1:1. In an alternative embodiment, the polymer matrix 108 is a dominant phase in the metal adsorbent, and the volume ratio of the silver-decorated graphene nano-platelets 102 to the polymer matrix 108 is in the range of 1:10 to 1:100, preferably 1:20 to 1:95, preferably 1:30 to 1:90.

Figure 1B:
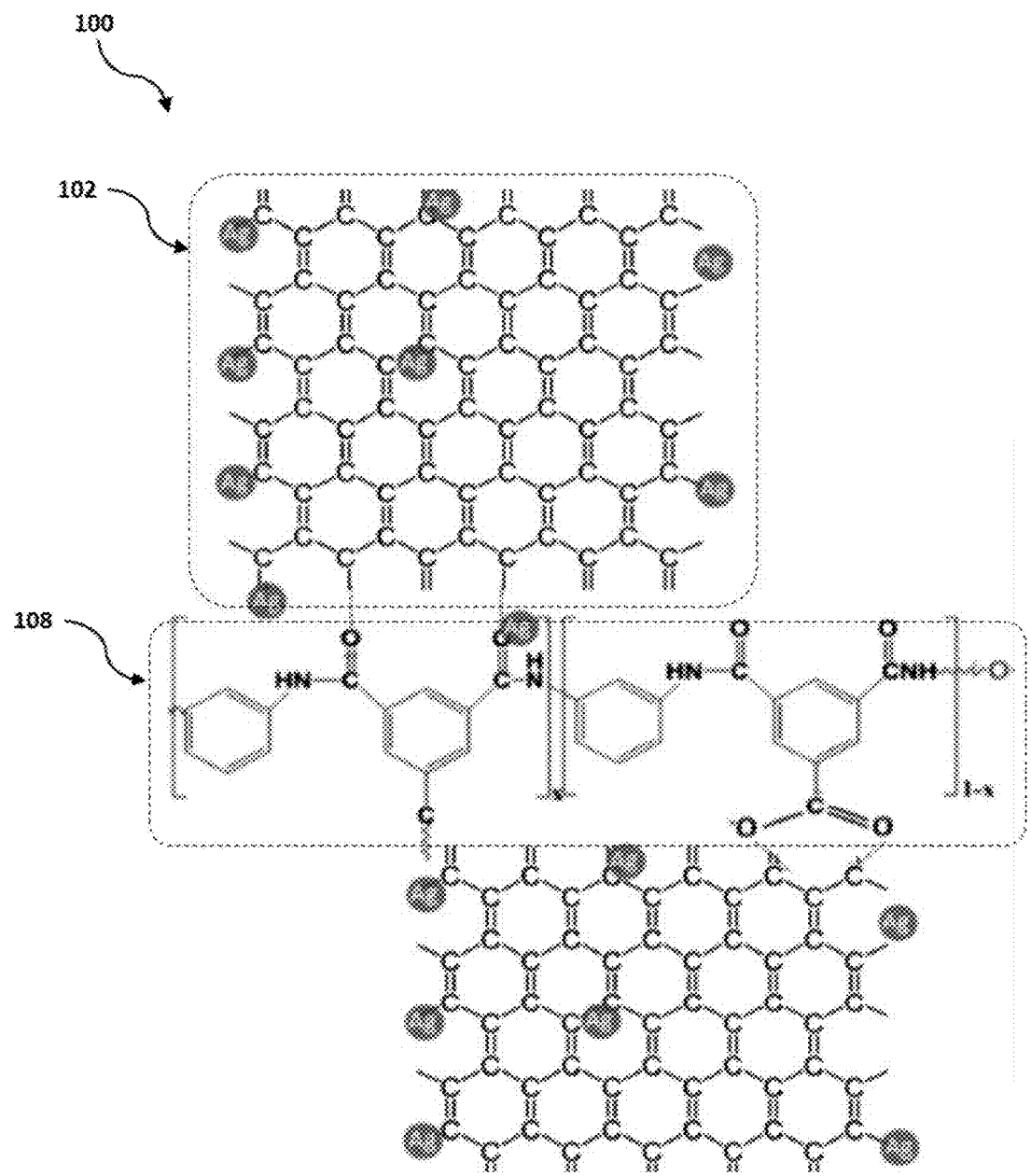
FIG. 1B is a schematic of a metal adsorbent that includes the silver-decorated graphene nano-platelets and a polyamide.

In a preferred embodiment, the polymer matrix 108 includes a polyamide (as shown in FIG. 1B), that includes reacted units of an aromatic amine and an acyl halide. In some preferred embodiments, said reacted units are formed from a polymerization reaction of an aromatic diamine and a di-acyl halide, or a polymerization reaction of an aromatic diamine and a tri-acyl halide.

In one embodiment, the aromatic amine is a diamine, wherein a first amine takes meta-, ortho-, or para-substitution position with respect to a second amine. However, in a preferred embodiment, the aromatic amine is a diamine, wherein the first amine takes meta-substitution position with respect to the second amine, as shown in the chemical structure of formula I. In one embodiment, the acyl halide is a di-acyl halide with a chemical structure as shown in formula II.

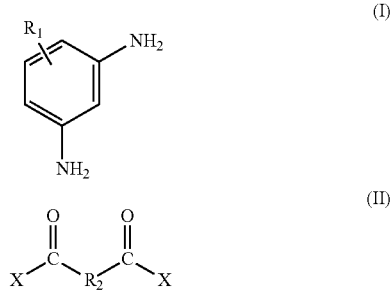

Accordingly, $R_1$ may optionally be a hydrogen, an optionally substituted alkyl, an optionally substituted cycloalkyl, an optionally substituted cycloalkylalkyl, an optionally substituted arylalkyl, an optionally substituted heteroaryl, an optionally substituted aryl, or an optionally substituted heterocyclyl.

In addition, $R_2$ may be an optionally substituted alkylene, an optionally substituted cycloalkylene, an optionally substituted heteroarylene, or an optionally substituted arylene, and X is a halogen atom. Preferably, $R_2$ is an optionally substituted arylene, more preferably a substituted phenylene, and X is a chlorine atom. In view of this embodiment, the polyamide is a linear chain polymer with a weight-average molecular weight in the range of 100,000 to 1,000,000 Dalton (Da), preferably 200,000 to 800,000 Da, or preferably 300,000 to 600,000 Da.

In a preferred embodiment, the aromatic amine is the diamine with a chemical structure of formula I, and the acyl halide is a tri-acyl halide with a chemical structure of formula III,

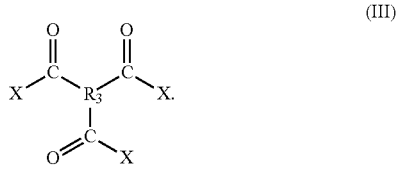

Accordingly, $R_3$ is a trivalent aliphatic group containing 2 to 10 carbon atoms, preferably 3 to 8 carbon atoms, or a trivalent aromatic group, and X is a halogen atom. In view of this embodiment, the polyamide is a crosslinked polymer with an average molecular weight between crosslinks in the range of 200 to 1,000 g/mol, preferably 400 to 900 g/mol, preferably 500 to 800 g/mol. In a preferred embodiment, $R_3$ is tri-substituted benzene and X is a chloride atom, e.g. trimesoyl chloride. Furthermore, in another preferred embodiment, the aromatic amine is phenylenediamine, more preferably meta- phenylenediamine (or m-phenylenediamine). In one embodiment, the polyamide is sulfonated.

The term "halogen atom" as used herein refers to any atom selected from the group 17 of the periodic table, preferably fluorine (F), chlorine (Cl), bromine (Br), or iodine (I).

The term "alkyl" as used herein refers to a straight, branched, or cyclic hydrocarbon fragment, with a general formula of $C_nH_{2n+1}$, wherein n ranges from 1 to 20, preferably 2 to 8 Such hydrocarbon fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl, vinyl, allyl, 1-propenyl, 2-propenyl, 1-butenyl, 2-butenyl, 3-butenyl, pentenyl, 2-pentenyl, 3-pentenyl, 4-pentenyl, 1-hexenyl, 2-hexenyl, 3-hexenyl, 4-hexenyl, or 5-hexenyl. As used herein, the term "cyclic hydrocarbons" refers to cyclized alkyl groups. Exemplary cyclic hydrocarbon (i.e. cycloalkyl) groups include, but are not limited to, cyclopropyl, cyclobutyl, cyclopentyl, cyclohexyl, norbomyl, and adamantyl. Branched alkyl groups, such as 1-methylcyclopropyl and 2-methycyclopropyl groups, are included in the definition of cycloalkyl as used in the present disclosure.

Additionally, the term "alkylene" as used herein refers to a divalent form of an alkane 5 with a general formula of $C_nH_{2n}$, wherein n ranges from 2 to 10, preferably 3 to 8. Exemplary alkylene compounds include but are not limited to, methylene, ethylene, propylene, butylene, isopropylene, and the like.

The term "cycloalkyl" as used refers to a cyclic alkyl having 3 to 7 carbon atoms and includes cyclopropyl, cyclobutyl, cyclopentyl, cyclohexyl, cycloheptyl. Further, "substituted cycloalkyl" may refer to cyclopropyl, cyclobutyl, cyclopentyl, cyclohexyl, or cycloheptyl substituted by at least one substituent selected from halogen (e.g. chlorine, bromine, fluorine or iodine), amino, nitro, hydroxy, alkyl, alkoxy (i.e. straight or branched chain alkoxy having 1 to 10 carbon atoms, and includes, for example, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy and decyloxy), cycloalkyloxy including cycloleptyloxy, cyclohexyloxy and cycloheptyloxy, aryloxy including phenoxy and phenoxy substituted with halo, alkyl, alkoxy, haloalkyl which means straight or branched chain alkyl having 1 to 8 carbon atoms which are substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-difluorobutyl, trichloromethyl, trifluoromethyl, 2,2,2-trifluoroethyl, 2,3,3-trifluoropropyl, 1,1,2,2-tetrafluoroetbyl, 2,2,3,3-tetrafluoropropyl.

Additionally, the term "cycloalkylene" as used herein refers to a divalent form of a cycloalkane having carbon atom ranges from 5 to 10, preferably 5 to 8.

The term "cycloalkylalkyl" as used herein refers to a straight or branched chain alkyl moiety having 1 to 8 carbon atoms that is substituted by a cycloalkyl group having 3 to 7 carbon atoms, and includes, for example, cyclopropylcarbinyl (i.e., carbinyl may also be termed methyl in this context), cyclobutylcarbinyl, cyclopentyicarbinyl, cyclohexylcarbinyl, cycloheptylmethyl, 2-cyclo-propylethyl, 2-cyclopentylethyl, 2-cyclohexylethyl, 3-cyclopropylpropyl, 3-cyclopentylpropyl, 3-cyclohexylpropyl, 4-cyclopropylbutyl, 4-cyclopentylbutyl, cyclohexylbutyl, 6-cyclopropylhexyl, 6-cyclohexylhexyl.

The term "arylalkyl" as used herein may include those radicals in which an aryl group is attached to an alkyl group (e.g., benzyl, phenethyl, pyridylmethyl, etc.) including those alkyl groups in which a carbon atom containing group (e.g., a methylene group) has been replaced by, for example, an oxygen atom (e.g., phenoxymethyl, 2-pyridyloxymethyl, 3-(1-naphthyloxy)propyl, etc.).

The term "heteroaryl" as used in this disclosure refers to 5 to 10 membered mono- or fused-hetero-aromatic rings which have at least one hetero atom selected from nitrogen, oxygen, and sulfur, and includes, for example, 2-furyl, 3-furyl, 2-thienyl, 3-thienyl, 2-pyridyl, 3-pyridyl, 4-pyridyl, pyrazolyl; imidazolyl, pyrimidinyl, pyridazinyl, pyrazinyl, benzimidazolyl, quinolyl, oxazolyl, thiazolyl, indolyl. Further, "substituted heteroaryl" may refer to 5 to 10 membered mono- or fused-heteroaromatic ring which has in the ring at least one hetero atom selected from nitrogen, oxygen, and sulfur, and which ring is substituted by at least one substituent selected from halogen, amino, vitro, hydroxy, alkyl, alkoxy and haloalkyl on the above-mentioned heteroaromatic nucleus.

In addition, the term "heteroarylene" refers to functional groups containing a divalent membered aromatic ring radical with 5 to 7 carbon atoms and one or more heteroatoms independently selected from S, O, or N. Examples of "heteroarylene" used herein include, but are not limited to, furan-2,5-diyl, thiophene-2,4-diyl, ,3,4-oxadiazole-2,5-diyl, 1,3,4-thiadiazole-2,5-diyl, 1,3-thiazole-2,4-diyl, 1,3-thiazole-2,5-diyl, pyridine-2,4-diyl, pyridine-2,3-diyl, pyridine-2,5-diyl, pyrimidine-2,4-diyl, quinoline-2,3-diyl, and the like.

The term "aryl" as used herein refers to phenyl, biphenyl, naphthyl, anthracenyl, and includes heteroaryl that can be furyl, imidazolyl, triazolyl, triazinyl, oxazolyl, isoxazolyl, thiazolyl, isothiazolyl, pyrazolyl, pyrrolyl, pyrazinyl, tetrazolyl, pyridyl, (or its N-oxide), thienyl, pyrimidinyl (or its N-oxide), 1H-indolyl, isoquinolyl (or its N-oxide) or quinolyl (or its N-oxide). Further, the term "substituted aryl" may refer to phenyl, naphthyl, or biphenyl substituted by at least one substituent selected from aroyl (as defined below), halogen (e.g.

chlorine, bromine, fluorine or iodine), amino, vitro, hydroxy, alkyl, alkoxy (i.e. straight or branched chain alkoxy having 1 to 10 carbon atoms, and includes, for example, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy and decyloxy), cycloalkyloxy including cyclopentyloxy, cyclohexyloxy and cycloheptyloxy, aryloxy including phenoxy and phenoxy substituted with halo, alkyl, alkoxy, haloalkyl which means straight or branched chain alkyl having 1 to S carbon atoms which are substituted by at least one halogen, and includes, for example, chloromethyl, bromomethyl, fluoromethyl, iodomethyl, 2-chloroethyl, 2 bromoethyl, 2-fluoroethyl, 3-chloropropyl, 3-bromopropyl, 3-fluoropropyl, 4-chlorobutyl, 4-fluorobutyl, diehloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4~ichlorobutyl, 4,4-difluorobutyl, trichloromethyl, trifluoromethyl, 2,2,2-tri-fluoroethyl, 2,3,3-trifluoropropyl, 1,1,2,2-tetrafluoroethyl, 2,2,3,3-tetrafluoropropyl.

Furthermore, the term "arylene" refers divalent unsaturated aromatic carbocyclic radicals having one to fifteen rings, such as phenylene, or multiple fused rings, such as naphthylene or anthrylene, or combinations thereof. Examples of "arylene" as used herein include, but are not limited to, benzene-1,2-diyl, benzene-1,3-diyl, benzene-1,4-diyl, naphthalene-1,8-diyl, anthracene-1,4-diyi, and the like.

The term "heterocyclyl" as used herein refers to a 3-8, preferably 4-8, more preferably 4-7 membered monocyclic ring or a fused 8-12 membered bicyclic ring which may be saturated or partially unsaturated, which monocyclic or bicyclic ring contains 1 to 4 heteroatoms selected from oxygen, nitrogen, silicon or sulfur. Examples of such monocyclic rings include oxaziridinyl, oxiranyl, dioxiranyl, aziridinyl, pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxiranyl, oxetanyl, dioxolanyl, dioxanyl, oxathiolanyl, oxathianyl, dithianyl, dihydrofuranyl, tetrahydrofuranyl, dihydropyranyl, tetrahydropyranyl, tetrahydropyridyl, tetrahydropyrimidinyl, tetrahydrothiophenyl, tetrahydrothiopyranyl, diazepanyl and azepanyl. Examples of such bicyclic rings include indolinyl, isoindolinyl, benzopyranyl, quinuclidinyl, 2,3,4,5-tetrahydro-1,3,benzazepine, 4-(benzo-1,3,dioxol-5-methyl) piperazine, and tetrahydroisoquinolinyl. Further, "substituted heterocyclyl" may refer to a heterocyclyl ring which has one or more oxygen atoms bonded to the ring (i.e. as ring atoms). Preferably, said atom which is bonded to the ring selected from nitrogen or sulphur. An example of a heterocyclyl substituted with one or more oxygen atoms is 1,1-dioxido-1,3-thiazolidinyl.

In addition to the polyamide, the polymer matrix may further include one or more polymers, including but are not limited to, a cellulose acetate, a nitrocellulose, a cellulose ester, a polytetrafluoroethylene (PTFE), a polyvinylidene fluoride (PVDF), a polyethylene (PE), a polypropylene (PP), a polyacrylonitrile (PAN), a polyimide, a polyvinylchloride (PVC), a polysulfone (PS), and a polyether sulfone (PES). Each of the aforementioned polymers may be sulfonated. Moreover, the polymer matrix may include a co-polymer, for example, a co-polymer of poly(hutyl-ammonium styrene) and polystyrene, or a co-polymer of poly(butyl.-ammonium styrene) and poly(chloromethyl styrene).

In one embodiment, the metal adsorbent is an aggregate of silver-decorated graphene nano-platelets that are dispersed within the polymer matrix 108, wherein the silver-decorated graphene nano-platelets may interact with the polymer matrix through Van der Waals interactions, and wherein said metal adsorbent is supported on a substrate. Presence of a substrate may provide mechanical strength and durability and prolong the lifetime of to the metal adsorbent. Accordingly, the metal adsorbent, preferably in a granular thim, may be deposited, affixed, or otherwise adhered onto the substrate using a polymeric binder. The substrate may be made of polyolefins e.g. polyethylene and polypropylene; polyesters e.g. polyethylene terephthalate, polytrimethylene terephthalate, and polybutylene terephthalate; polyamides e.g. nylon 6, nylon 66, and nylon 12; polyurethanes; fluorinated polymers; polyetherketones; polystyrene; sulfonated polyetherketones; sulfonated polystyrene and derivatives thereof, cellulose and derivatives thereof, and combinations thereof. In some embodiments, the substrate may further include hydrophobic/hydrophilic copolymers. Exemplary copolymers include, but are not limited to, polyurethane copolymers, polyurea copolymers, polyether-b-polyarnide, PEG modified fluorinated copolymers, ethylene-propylene copolymers, cellulose based copolymers, ethylene based copolymers, and propylene based copolymers. Also, exemplary polymeric binders that may be used to bind the metal adsorbent onto the substrate preferably include, but are not limited to, an epoxy polymer, an acrylic polymer, a vinyl ester polymer, etc.

The metal adsorbent 100 further includes silver-decorated graphene nano-platelets 102 that are dispersed in the polymer matrix 108. The Willi "silver-decorated graphene nano-platelets" refers to graphene nano-platelets 104 and silver nanoparticles 106 deposited thereon, as shown in FIG. 1A. A volume ratio of the silver nanoparticles 106 to the graphene nano-platelets 104 in the silver-decorated graphene nano-platelets 102 is in the range of 1:20 to 1:1,000, preferably 1:50 to 1:800, preferably 1:80 to 1:500, preferably about 1:100.

A "graphene nano-platelet" as used in this disclosure relates to a stack of a plurality of graphene sheets, preferably less than 100 graphene sheets, more preferably less than 60 graphene sheets, even more preferably less than 30 graphene sheets, wherein each graphene nano-platelet has an average thickness in the range of about 1 to 20 nm, preferably about 5 to 18 nm, preferably about 10 to 15 nm, and an average diameter in the range of about 0.5 to 100 µm, preferably about 1 to 50 µm, preferably about 5 to 30 µm, preferably about 10 to 20 µm. The term "diameter" as used for the graphene nano-platelets or other nanoparticles that are described in this disclosure refers to a diameter of said nanoparticles, which is preferably defined as follows: "a diameter of a nanoparticle is a diameter of a solid sphere with a volume that is substantially the same as the volume of the nanoparticle." Additionally, the term "graphene sheet" as used herein refers to a single layer of graphite, i.e. pristine graphene, or a single layer of graphite oxide, i.e. graphene oxide.

Alternatively, when the graphene nano-platelets have irregular shapes and geometries, that is when the graphene nano-platelets do not have a plate-like form, but instead have an irregular shape, each graphene nano-platelet may preferably have a largest spatial dimension of less than 100 µm, preferably less than 80 µm, preferably less than 60 µm, preferably less than 30 µm, preferably 20 µm. Furthermore, the largest spatial dimension of each graphene nano-platelet may preferably be greater than 20 nm, preferably greater than 50 nm, more preferably greater than 100 nm. In one embodiment, the graphene nano-platelets have irregular shapes and geometries, wherein each graphene nano-platelet has a largest spatial dimension in the range of 20 nm to 100 µm, preferably 100 nm to 80 µm, preferably 1 µm to 60 µm, preferably 10 µm to 30 µm. The term "largest spatial dimension" as used herein is a size characteristic of an irregular-shape nanoparticle, which refers to the largest measurable length in the irregular-shape nanoparticle. In one embodiment, the graphene nano-platelets have an aspect ratio in the range of 1,000 to 50,000, preferably 5,000 to 40,000, preferably 10,000 to 30,000, preferably 15,000 to 25,000. The term "aspect ratio" in regards to the graphene nano-platelets refers to a ratio of the largest spatial dimension to the thickness of the graphene nano-platelets. Therefore, irregular shaped particles falling within these aspect ratio ranges may still meet the definition of and be considered to be "nano-platelets" herein.

In one embodiment, the graphene nano-platelets 104 have an average bulk density in the range of 0.05 to 0.5 g/cc, preferably 0.1 to 0.45 g/cc, preferably 0.2 to 0.4 g/cc. In another embodiment, a carbon content of the graphene nano-platelets is at least 98 wt %, preferably at least 99 wt %, preferably at least 99.5 wt %, more preferably at least 99.9 wt %, with less than 2 wt %, preferably less than 1 wt %, preferably less than 0.5 wt %, more preferably less than 0.1 wt % of impurities, with each weight percent being relative to the total weight of the graphene nano-platelets.

In some embodiments, graphene sheets present in the graphene nano-platelets 104 are either pristine graphene or graphene oxide, but not in the form of reduced graphene oxide (rGO). The term "graphene oxide" as used herein refers to an oxidized version of the graphene nano-platelets having less than 100, more preferably less than 60, even more preferably less than 30 of $sp^2$ hybridized graphene sheets. The graphene oxide may include one or more functional groups selected from the group consisting of carboxylate, hydroxyl, carbonyl, and epoxide. Said functional groups may occur to the edge of the graphene oxide, to the basal plane of the graphene oxide, or to both the edge and the basal plane of the graphene oxide. In some embodiments, the functionalized groups are present at a molar concentration of no more than 1 µmol, preferably no more than 0.96 µmol, preferably no more than 0.8 µmol, preferably no more than 0.5 µmol per each $µm^2$ of the graphene oxide.

In one embodiment, a volume ratio of the silver-decorated graphene nano-platelets 102 to the polymer matrix 108 is in the range of 2:1 to 1:5, preferably 1.5:1 to 1:2, preferably 1.2:1 to 1:1.5, preferably about 1:1. In view of that, in some embodiments the phase that includes the silver-decorated graphene nano-platelets is the dominant phase, for example, when the volume ratio of the silver-decorated graphene nano-platelets to the polymer matrix is in the range of 2:1 to 1.1:1. in some alternative embodiments, however, the phase that includes the polymer matrix is the dominant phase, for example, when the volume ratio of the silver-decorated graphene nano-platelets to the polymer matrix is in the range of 1:1.1 to 1:5. Accordingly, the silver-decorated graphene nano-platelets may preferably homogeneously dispersed in the polymer matrix with processing methods known in the art. The term "homogenously dispersed" as used herein refers to an embodiment where a volume fraction of the silver-decorated graphene nano-platelets in any given volume of the metal adsorbent may preferably be substantially the same as the specified volume ratio for the metal adsorbent. For example, in one embodiment, the volume ratio of the silver-decorated graphene nano-platelets to the polymer matrix is 1:4. Therefore, a volume fraction of the silver-decorated graphene nano-platelets in any given volume of the metal adsorbent, for example 1 $mm^2$ or 500 $µm^2$ is about 0.2.

In one embodiment, the graphene nano-platelets 104 are not functionalized, and subsequently the silver-decorated graphene nano-platelets 102 are not functionalized either. In view of that, the silver-decorated graphene nano-platelets are physically dispersed in the polymer matrix 108, i.e. Van der Waals interactions may be present between the silver-decorated graphene nano-platelets 102 and the polymer matrix 108, with no chemical bonding present therebetween.

In another embodiment, the silver-decorated graphene nano-platelets 102 are present in the metal adsorbent 100 in an amount from about 1.0 wt % to about 20 wt %, preferably from about 2.0 to about 15 wt %, preferably from about 5.0 to about 10 wt %. Yet, in another embodiment, the silver-decorated graphene nano-platelets are present in the metal adsorbent in an amount of less than 50 wt %, preferably less than 40 wt %, preferably less than 30 wt %, preferably less than 25 wt %, preferably less than 20 wt %. Each weight percent is relative to the total weight of the metal adsorbent. Considering the embodiments where the volume ratio of the silver nanoparticles 106 to the graphene nano-platelets 104 in the silver-decorated graphene nano-platelets 102 is in the range of 1:20 to 1:1,000, preferably 1:50 to 1:800, preferably 1:80 to 1:500, preferably about 1:100, a total amount of the silver nanoparticles 106 in the metal adsorbent 100 is in the range of about 0.001% w/w to about 1% w/w, preferably about 0.005% w/w to about 0.1% w/w, preferably 0.008% w/w to about 0.08% w/w, preferably about 0.01% w/w to about 0.05% w/w, preferably about 0.02% w/w to about 0.04% w/w.

The silver nanoparticles 106 that are deposited on the graphene nano-platelets 104 (as shown in FIG. 1A) may have an average diameter in the range of 1 to 100 nm, preferably 5 to 90 nm, preferably 10 to 80 nm, preferably 15 to 70 nm, preferably 20 to 60 nm, preferably 25 to 50 nm, preferably 30 to 45 nm. In a preferred embodiment, the silver nanoparticles 106 are substantially spherical with an average diameter of less than 50 nm, preferably less than 40 nm, preferably less than 30 nm, preferably less than 20 nm, preferably less than 10 nm, preferably less than 5 nm. In one embodiment, the silver nanoparticles 106 have a specific surface area in the range of 1 to 10 $m^2/g$, preferably 2 to 9 $m^2/g$, preferably 3 to 8 $m^2/g$, preferably 4 to 7 $m^2/g$, preferably 5 to 6 $m^2/g$, preferably about 5.4 $m^2/g$.

In a preferred embodiment, the silver nanoparticles 106 are either located on a free surface of the graphene nano-platelets 104 (as shown in FIG. 1A), or intercalated between graphene sheets of the graphene nano-platelets (not shown). In the embodiment where the silver nanoparticles are intercalated between graphene sheets of the graphene nano-platelets, a gap between the graphene sheets may be increased, and thus a porosity of the metal adsorbent is increased subsequently. In view of that, a porosity of the metal adsorbent 100 may be increased by at least 10%, preferably at least 20%, preferably at least 30%, preferably at least 40%, preferably at least 50%, but no more than 100%, with each percentile being relative to an initial porosity of the metal adsorbent. In another preferred embodiment, the silver nanoparticles 106 are only located on the free surface of the graphene nano-platelets (as shown in FIG. 1A), but not dispersed in the polyimide and not intercalated between graphene sheets of the graphene nano-platelets.

The presence of the silver nanoparticles 106 may provide an antimicrobial effect to 10 the metal adsorbent. In view of that, the silver nanoparticles may prevent formation of microorganisms (e.g. bacteria) within the metal adsorbent. The silver nanoparticles have an antimicrobial effect against bacteria and/or fungi, which include but are not limited to, *Staphylococcus aureus*, *Klebsiella pneumonia*, *Escherichia coli*, *Chlamydia trachomatis*, *Providencia stuartii*, *Pneumobacillus*, *Vibrio vulnificus*, *Candida albicans*, *Bacillus cloacae*, *Pseudomonas maltophila*, *Pseudomonas aeruginosa*, *Streptococcus hemolyticus B*, *Citrobacter* and *Salmonella paratyphi C*. In one embodiment, the silver nanoparticles described herein may kill at least $10^5$ CFU/mL, preferably at least $10^6$ CFU/mL of *Escherichia coli* (*E.coli*) in a liquid.

In addition to the silver nanoparticles, one or more metals and/or metal oxides may also be deposited on the graphene nano-platelets 104. Accordingly, said metal is at least one element selected from the group consisting of Fe, Pd, Pt, Au, Ru, Ir, Rd, Ti, Co, Ni, Cu, Zn, Cr, V, Al, Sn, In, Ce, Mo, Ag, Se, Te, Y, Eu, Nb, Sm, Nd, Ga, and Gd. In the embodiments where a metal (i.e. in free form) coexist with its metal oxide, a weight ratio of the metal oxide to that of the metal is in the range of from about 1:1 to about 1:5, preferably from about 1:2 to about 1:4. Said metals and/or metal oxides may preferably have an average size of less than 100 nm, preferably less than 80 nm, preferably less than 50 nm.

Similar to the silver nanoparticles, in some embodiments, the one or more metals and/or metal oxides are located on a free surface of the graphene nano-platelets 104, or intercalated between graphene sheets of the graphene nano-platelets. In the embodiment Where the one or more metals and/or metal oxides are intercalated between graphene sheets of the graphene nano-platelets, a gap between the graphene sheets may be increased, and thus a porosity of the metal adsorbent is increased subsequently. In view of that, a porosity of the metal adsorbent 100 may be increased by at least 10%, preferably at least 20%, preferably at least 30%, preferably at least 40%, preferably at least 50%, but no more than 100%, with each percentile being relative to an initial porosity of the metal adsorbent. In another preferred embodiment, the one or more metals and/or metal oxides are only located on a free surface of the graphene nano-platelets, but not dispersed in the polyami.de and not intercalated between graphene sheets of the graphene nano-platelets.

In one embodiment, the silver nanoparticles 106 are located on a free surface of the graphene nano-platelets 104, and the metal adsorbent 100 has an average pore size in the range of 50 to 1,000 Å, preferably 60 to 800 Å, preferably 70 to 500 Å, preferably 75 to 100 Å, preferably about 80 Å. In some other embodiments, the metal adsorbent 100 has an average pore size in the range of 100 to 500 Å, preferably 150 to 400 Å, preferably 200 to 350 Å, preferably 250 to 300 Å. Accordingly, the metal adsorbent 100 has a specific surface area in the range of 200 to 300 $m^2/g$, preferably 210 to 290 $m^2/g$, preferably 220 to 280 $m^2/g$, preferably 230 to 270 $m^2/g$, preferably 235 to 260 $m^2/g$, preferably about 240 $m^2/g$. Yet in another embodiment, the silver nanoparticles are intercalated between graphene sheets of the graphene nano-pl.atel.ets and the metal adsorbent has an average pore size in the range of 100 to 1,200 Å, preferably 200 to 1,000 Å, preferably 250 to 900 Å, preferably 300 to 500 Å, preferably about 400 Å. Accordingly, the metal adsorbent has a specific surface area in the range of 250 to 350 $m^2/g$, preferably 260 to 340 $m^2/g$, preferably 270 to 330 $m^2/g$, preferably 270 to 320 $m^2/g$, preferably 280 to 310 $m^2/g$, preferably about 300 $m^2/g$.

According to a second aspect, the present disclosure relates to a method of making the metal adsorbent. The method involves mixing the silver-decorated graphene nano-platelets with the aromatic amine and water to form a suspension, wherein a weight ratio of the silver-decorated graphene nano-platelets to the aromatic amine is in the range of 2:1 to 1:4, preferably 1.5:1 to 1:1.5, more preferably about 1:1. In addition, the acyl halide is separately dissolved in an organic solvent to form an acyl halide solution. The organic solvent may be at least one selected from the group consisting of methanol, toluene, tetrahydrofuran, acetone, acctonitrilc, butanol, dichloromethane, chloroform, chlorobenzene, dichloroethane, diethylene glycol, diethyl ether, dimethoxy-ethane, dimethyl-formamide, dimethyl sulfoxide, ethanol, ethyl acetate, ethylene glycol, and n-hexane. In a preferred embodiment, the organic solvent is n-hexane. In addition, water is preferably deionized distilled water.

In one embodiment, an amount of the aromatic amine per liter of the suspension is in the range of 5 to 15 g, preferably 6 to 14 g, preferably 7 to 13 g, preferably 8 to 12 g, preferably 9 to 11 g, preferably about 10 g. Furthermore, an amount of the acyl halide per liter of the acyl halide solution is in the range of 0.5 to 1.5 g, preferably 0.8 to 1.2, preferably about 1.0 g. In an alternative embodiment, both the aromatic amine and the acyl halide are di-functional (i.e. having two functional groups), wherein a molar ratio of the aromatic amine to the acyl halide is 5:1 to 1:5, preferably 3:1 to 1:3, preferably 2:1 to 1:2, preferably 1.1:1 to 1:1.1, more preferably 1:1. In yet another embodiment, the aromatic amine is di-functional and the acyl halide is tri-functional (i.e. having three acyl halide functional groups), wherein a molar ratio of the aromatic amine to the acyl halide is 3:1 to 1:3, preferably 2:1 to 1:2, preferably 3.5:2 to 3:2.5, preferably 3.1:2 to 3:2.1, preferably 3:2.

The method further involves mixing the acyl halide solution with the suspension. Preferably, the suspension may gradually be added to the acyl halide solution, whereas the acyl halide solution is stirred and is kept isothermal at a temperature in the range of 50 to 70° C., preferably about 60° C. The suspension may be added to the acyl halide solution in a dropwise manner with a flow rate of no more than 500 ml/min, or no more than 100 ml/min. Alternatively, the suspension may he added to the acyl halide solution with a flow rate in the range of 1 to 100 L/min, preferably 20 to 80 L/min, preferably about 50 L/min.

Polymerization reactions between the acyl halide and the amine may start upon adding the suspension to the acyl halide solution at an elevated temperature in the range of 50 to 70° C., preferably 52 to 65° C., preferably about 55° C. Preferably, said mixture of the suspension and the acyl halide solution is kept isothermal in said temperature ranges for at least 8 hours, preferably at least 10 hours, but no more than 12 hours, during which the polymerization reactions may be carried out through a step-growth polymerization pathway or a free-radical polymerization pathway, thus forming a polyatnide and the silver-decorated graphene nano-platelets are dispersed therein. In a preferred embodiment, mixture of the suspension and the acyl halide solution is sonicated, or preferably ultra-sonicated, for at least 0.5 hours, preferably at least 1 hour, but no more than 2 hours. Sonicated mixture may further be roll-milled with an adjusted gas size to homogenously disperse the silver-decorated graphene nano-platelets in the mixture, prior to heating the mixture to polymerize.

Preferably, all or some of the aforementioned steps of the method of making the metal adsorbent are performed in an inert atmosphere, for example, in an atmosphere filled with at least one inert gas selected from the group consisting of nitrogen gas, argon gas, and helium gas.

In addition, the aforementioned polymerization reaction protocols are not meant to be limiting, and various polymerization reaction protocols, e.g. reaction times, pre-curing, curing, or post-curing protocols, reaction temperatures and pressures, etc. may also be utilized.

In one embodiment, the silver-decorated graphene nano-platelets are produced, and then mixed with the aromatic amine and water to form the suspension. Accordingly, an aqueous silver solution, e.g. an aqueous silver nitrate solution, is first mixed with graphene nano-platelets and sonicated to form a first suspension. Other aqueous silver solutions that may be utilized include but are not limited to, an aqueous silver carboxylate solution, an aqueous silver chloride solution, an aqueous silver carbonate solution, and an aqueous silver oxalate solution. The first suspension may further be mixed with a stabilizing agent and stirred. During the mixing and stirring the first suspension with the stabilizing agent, silver nanoparticles arc deposited on the graphene nano-platelets, and thus forming the silver-decorated graphene nano-platelets within the first suspension. The first suspension may further be centrifuged to remove the silver-decorated graphene nano-platelets from a supernatant. Resulting silver-decorated graphene nano-platelets may be washed with an organic solvent, e.g. methanol or toluene, filtered and then dried at a temperature of less than 55° C., preferably less than 50° C., to evaporate the organic solvent. The stabilizing agent, as used herein, may preferably be an aqueous sodium borohydride solution, which is produced by dissolving sodium borohydride, i.e. $NaBH_4$, in water.

Referring now to FIGS. 6A, 6B, and 6C. According to a third aspect, the present disclosure relates to a filtration system 600 configured to adsorb at least a portion of one or more heavy metals and respective cations from a liquid. The term "liquid" as used herein preferably refers to water that is contaminated with said heavy metals and respective cations, although the term "liquid" is not limited to water, and the liquid may encompass one or more organic solvents, hydrocarbon compounds, crude oil, etc. Preferably, the liquid is water which may be provided from various resources, including but are not limited to, an ocean or a sea, a river, a lake, an underground reservoir, etc. or water provided from municipal pipelines.

The term "heavy metal" as used in this disclosure encompasses a metallic element and its respective cations at different oxidation states. For example, arsenic refers to arsenic element in a zero-valent state, and cations of $As^{3+}$ and $As^{5+}$.

In a preferred embodiment, said heavy metals and respective cations are at least one selected from the group consisting of mercury, chromium, cadmium, lead, nickel, copper, and cations thereof. In addition, the filtration system 600 may adsorb elements such as arsenic, zinc, manganese, cobalt, nickel, selenium, silver, gold, antimony, thallium, and cations thereof.

Further to the heavy metals, the filtration system 600 may reduce a concentration of organic pollutants, inorganic pollutants, and/or microorganisms. Exemplary organic pollutants may include, but are not limited to, methylene blue, methyl orange, trichloroethylene, tetrachloroethylene, polychlorinated biphenyl, carbon tetrachloride, and nitro aromatic compounds such as 2,4-dinitroanisole (DNAN), n-methyl-4-nitroaniline (MNA), and hexahydro-1,3,5-trinitro-1,3,5-trazine (RDX). Exemplary inorganic pollutants may include, but are not limited to, hydrogen fluoride, hydrochloric acid, bromic acid, acetic acid, and anions such as perchlorates, nitrates, phosphates, carbonates, sulfates.

The term "microorganisms" as used herein refers to viruses, bacteria, and/or fungi, which include, but are not limited to, *Staphylococcus aureus*, *Klebsiella pneumonia*, *Escherichia coli*, *Chlamydia trachomatis*, *Providencia stuartii*, *Pneumobacillus*, *Vibrio vulnificus*, *Candida albicans*, *Bacillus cloacae*, *Pseudomonas maltophila*, *Pseudomonas aeruginosa*, *Streptococcus hemolyticus B*, *Citrobacter* and *Salmonella paratyphi C*.

Preferably, the microorganisms may effectively be removed from the liquid, when the liquid is brought into contact with the metal adsorbent, wherein the microorganisms become inactivated by the silver nanoparticle present in the metal adsorbent, and further adsorbed onto the highly porous metal adsorbent, and thus effective removed from the liquid.

The filtration system 600 includes a vessel 602 with an internal cavity, a liquid inlet 604, a liquid outlet 606, and the metal adsorbent disposed inside the internal cavity of the vessel 602.

Preferably, the vessel 602 has a cylindrical geometry which may be either vertically or horizontally oriented, wherein the liquid enters the vessel from a bottom or a top end (when the reactor is vertically oriented) or from a left or a right end (when the reactor is horizontally oriented). In a preferred embodiment, the vessel is in a form of a fixed-bed adsorber packed with the metal adsorbent, wherein the liquid is passed through the metal adsorbent and the heavy metals or cations, organic pollutants, inorganic pollutants, and/or microorganisms are adsorbed onto the metal adsorbent. A sizing and/or the type of materials used to construct the vessel is not meant to be limiting, and the vessel may be made of different materials in different sizes.

In one embodiment, at least 50%, preferably at least 60%, preferably at least 70%, preferably at least 80%, preferably at least 85%, but no more than 90%, of the total volume of the vessel 602 is filled with the metal adsorbent 100, as shown in FIGS. 6A, 6B, and 6C.

The liquid inlet 604 and the liquid outlet 606 are configured as passages for loading and unloading the vessel 602 with the liquid. In a preferred embodiment, the vessel is vertically oriented, wherein the liquid inlet 604 is located proximal to the top of the vessel and the liquid outlet 606 is located proximal to the bottom of the vessel. Accordingly, the liquid has a downward flow direction inside the vessel. A pump 608 may be present to adjust a flow rate of the liquid in the vessel. In an alternative embodiment, the vessel is vertically oriented, wherein the liquid inlet 604 is located proximal to the bottom of the vessel and the liquid outlet 606 is located proximal to the top of the vessel, and the liquid is pumped to the vessel using a pump 608. In view of this embodiment, the liquid has an upward flow direction inside the vessel.

The phrase "proximal to the bottom of the vessel" as used herein refers to a region of the vessel that is located less than 20%, preferably less than 15%, preferably less than 10%, preferably less than 5% of the height of the vessel, when measured from the bottom of the vessel, with 0% being the bottom and 100% being the top of the vessel. Alternatively, the phrase "proximal to the top of the vessel" as used herein refers to a region of the vessel that is located less than 20%, preferably less than 15%, preferably less than 10%, preferably less than 5% of the height of the vessel, when measured from the top of the vessel, with 0% being the top and 100% being the bottom of the vessel.

Preferably, the liquid inlet and the liquid outlet are substantially the same, although sizing of and/or the type of materials used to construct the liquid inlet and the liquid outlet is not meant to be limiting and the liquid inlet and the liquid outlet may be made of different materials in different sizes. Other than the liquid inlet and the liquid outlet designed to allow ingress and egress, the vessel may be sealed to prevent any leakage.

According to a fourth aspect, the present disclosure relates to a method of reducing a heavy metal content of the liquid by contacting the liquid with the metal adsorbent to adsorb at least a portion of the heavy metals onto the metal adsorbent.

The liquid may be contacted with the metal adsorbent by passing the liquid though the metal adsorbent, for example by using the filtration system as described, in a continuous or a semi-continuous fashion. Also, the liquid may be contacted with the metal adsorbent by dipping the metal adsorbent into the liquid in a batch mode. For example, in one embodiment, the metal adsorbent is present in a fabric-made bag or a meshed structure housing, and said bag or housing is dipped in the liquid, wherein at least a portion of heavy metals, organic pollutants, inorganic pollutants, and/or microorganisms are adsorbed onto the metal adsorbent.

In one embodiment, the heavy metal content of a liquid is reduced by at least 10%, preferably at least 20%, preferably at least 30%, preferably at least 40%, preferably at least 50%, preferably at least 60%, preferably at least 70%, preferably at least 80%, preferably at least 90%, preferably at least 95%, preferably at least 99%, after the liquid is contacted with the metal adsorbent. Each percentile is relative to an initial amount of the heavy metal content of the liquid. For example, in one embodiment, the heavy metal content of a water sample is initially about 10,000 ppm, wherein the heavy metal content reduces down to about 1,000 ppm after the water sample being contacted with the metal adsorbent. Accordingly, the heavy metal content of the water sample is reduced by about 90%.

The examples below are intended to further illustrate protocols for the metal adsorbent and the method of making thereof as well as the filtration system, and are not intended to limit the scope of the claims.

EXAMPLE 1

Preparation of Silver Nanoparticles

Some of the main materials used in this work include: (1) Silver nitrate, (2) polysulfone (PS), (3) m-phenylenediamine (MPD), (4) trimesoyl chloride (TMC), (5) n-hexane, and (5) N,N-dimethylf ormamide (DMF), which were obtained from Sigma-Aldrich.

Silver nanoparticles (Ag NPs) were prepared as follows: First, 50 mL of an aqueous 0.01 M $AgNO_3$ solution was prepared as a precursor of the Ag NPs. Second, 150 mL of an aqueous 0.02 M $NaBH_4$ solution was prepared as a stabilizing agent by dissolving 0.1134 g in distilled water. The sodium borohydride solution was placed in an ice bath for 20 min to be cooled. Then, the $AgNO_3$ solution was added to $NaBH_4$ solution at rate of 1 drop/sec with continual stirring the mixture in the ice bath. After the addition of the silver nitrate solution, the color of the mixture was turned to dark yellow indicating the formation of the nanoparticles. Finally, the solution and side products were removed by centrifuging the mixture. The resulting silver nanoparticles may further be sonicated in deionized water.

EXAMLPE 2

Preparation of Silver Nanoparticles Decorated Graphene

Silver nanoparticle decorated-graphene (Ag NPs/graphene) was prepared by a relatively similar chemical method as follows: First, 100 mL of an aqueous 0.01 M $AgNO_3$ solution was prepared as a precursor of the silver nanoparticle. Second, 150 mL of an aqueous 0.02 M $NaBH_4$ solution was prepared as a stabilizing agent by dissolving 0.1134 in distilled water. The sodium borohydride solution was placed in ice bath for 20 min to be cooled. Then, 4 mg of graphene was added to the $AgNO_3$ solution, and stirred. After that, the mixture of $AgNO_3$ solution and graphene was added to the sodium borohydrid.e solution at rate of 1 drop/sec with continual stirring the mixture in the ice bath. After the addition of the silver nitrate solution, the color of the mixture was turned to dark yellow indicating the formation of nanoparticles. Finally, the solution and side products were removed by centrifuging the mixture. The resulting silver decorated-graphene nanoparticles may further be sonicated in deionized water.

EXAMPLE 3

Synthesis of Ag/graphene/ployamide

The hybrid material was prepared by preparing 1.0 g of Ag NPs/graphene, i.e. 1% (w/v) solution, 1.0 g of m-phenylenediamine in 100 mL water, and 0.1 g of trimesoyl chloride in 100 mL of n-hexane solution, i.e. 0.1% (w/v). Then the solution m-phenylenediamine was added slowly to the solution of trimesoyl chloride under stirring and heating overnight. After that, the mixture was washed and filtered and the product was collected and kept in a temperature of

EXAMPLE 4

Synthesis of Ag/polyamide

The hybrid material was prepared by preparing 1.0 g of Ag NPs, i.e. 1% (w/v) solution, 1.0 g of m-phenylenediamine in 100 mL water, and 0.1 g of trimesoyl chloride in 100 mL of n-hexane solution, i.e. 0.1% (w/v). Then the solution m-phenylenediamine was added slowly to the solution of trimesoyl chloride under stirring and heating overnight. After that, the mixture was washed and filtered and the product was collected and kept in a temperature of 50° C. overnight.

EXAMPLE 5

Characterization

The structure of the synthesized materials was characterized by adsorption desorption of nitrogen at −196° C. on a Micromeritics ASAP 2020 surface area with porosimetry analyzer (Micromeritics, USA) to determine Bnmauer-Emmett-Teller (BET) surface area.

The surface of the synthesized materials was examined using low vacuum JEOL (JSM-661 OL V) scanning electron microscope (SEM) equipped with tungsten electron gun. The energy dispersive X-ray spectroscopy (EDX) analysis was conducted to understand the composition of the synthesized materials. The Fourier transform infrared spectroscopy (FT-IR) was used to identify the type of functional groups present on the prepared adsorbents. The spectra were taken using Nicolet 6700 spectrometer (Thermo Electron, USA) with a resolution of 2.0 cm$^{-1}$ well equipped with Deuterated triglycine sulfate detector and an OMNIC program. The experiments were conducted on the powdered samples grounded in an agate mortar to produce KBr pellets and spectra were obtained by adding 64 scans and corrected for the background noise. The spectrum of the sample was recorded in a transmission mode and the range of wavenumber was from 4000 to 400 cm$^{-1}$.

EXAMPLE 6

Results

Figure 3:
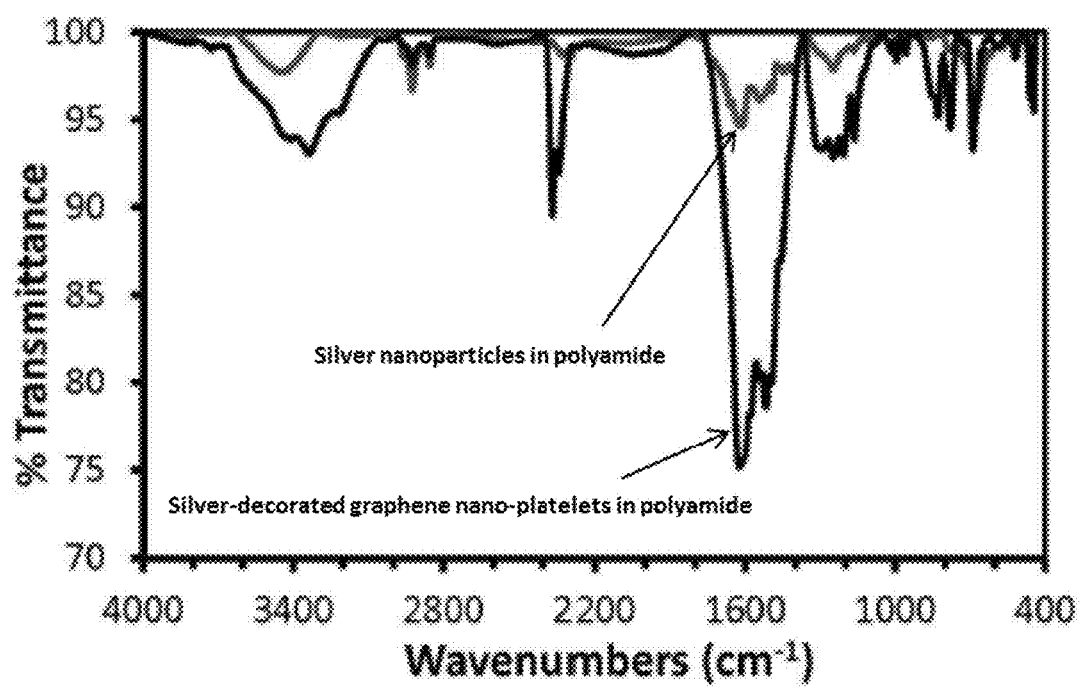
FIG. 3 represents FTIR spectra of silver nanoparticles in polyamide, and silver-decorated graphene nano-platelets in polyamide.
Figures 4A, 4B:
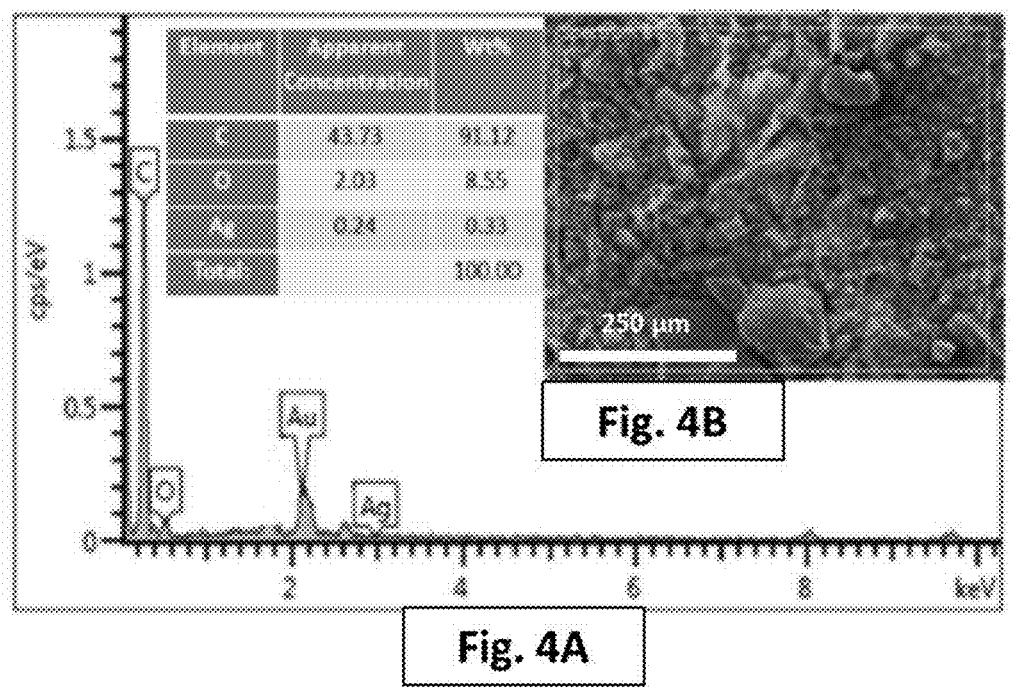
FIG. 4A represents an EDX spectrum of a surface of a metal adsorbent, i.e. a composite of silver-decorated graphene nano-platelets in polyamide.
FIG. 4B is a SEM micrograph of a surface of the metal adsorbent.
Figures 4C, 4D:
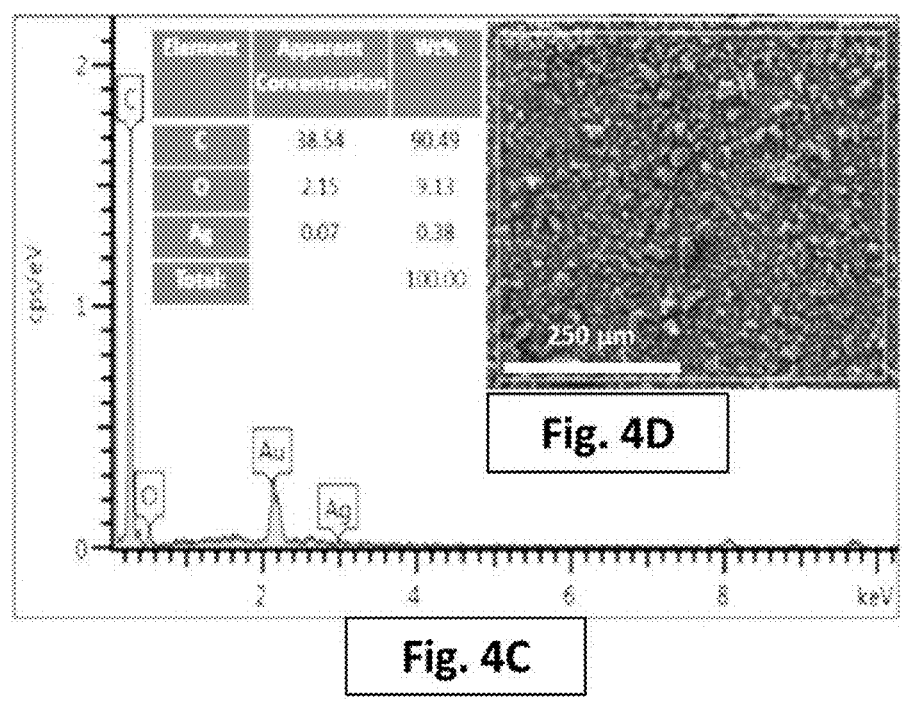
FIG. 4C represents an EDX spectrum of a surface of a composite of silver nanoparticles in polyamide.
FIG. 4D is a SEM micrograph of a surface of a composite of silver nanoparticles in polyamide.
Figure 5A:
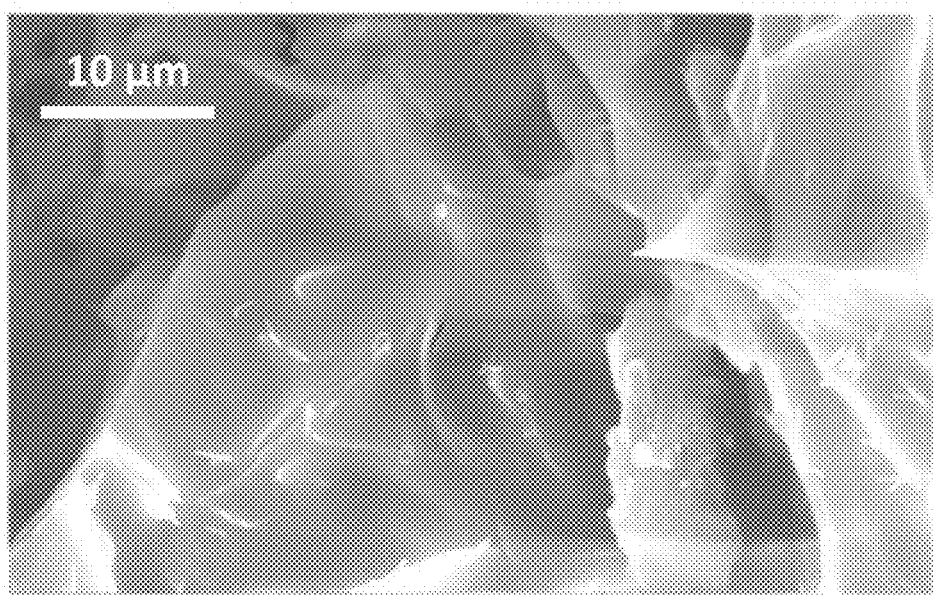
FIG. 5A is a magnified SEM micrograph of a surface of a composite of silver nanoparticles in polyamide.
Figure 5B:
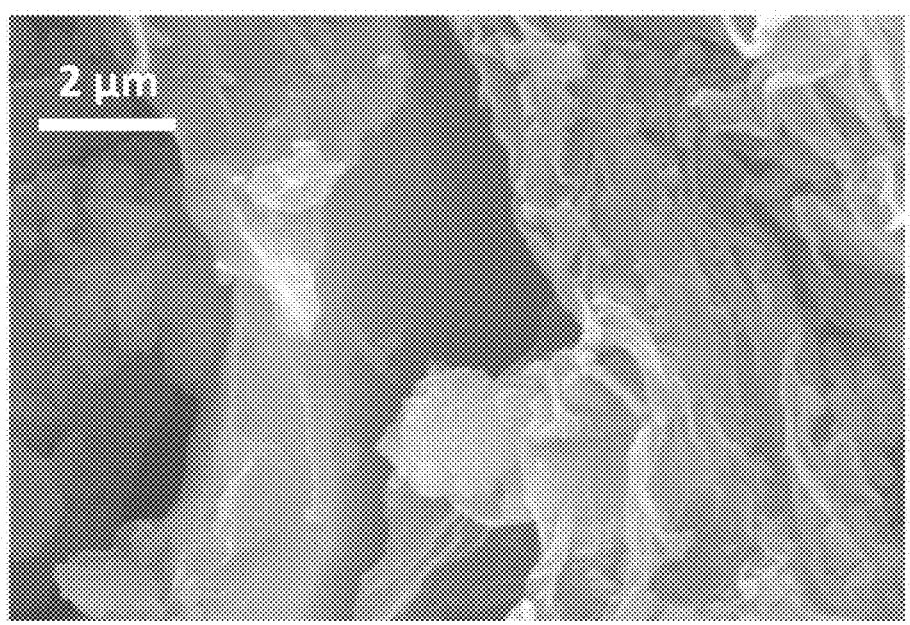
FIG. 5B is a magnified SEM micrograph of a surface of the metal adsorbent, i.e. a composite of silver-decorated graphene nano-platelets in polyamide.

The specific surface area and the pore size of the prepared resin as determined by BET were found to be 242 m$^2$/g and 79 Å, respectively. The results of FUR analysis of this study show different bonding stretches at different bands. As shown in FIG. 3, the following bands were observed at 3450 cm$^{-1}$ that relates to the N—H stretch. The band at 2777 cm$^{-1}$ that relates to aldehyde groups, while the band at around 2900 cm$^{-1}$ that relates to the C—H bonds. The band 1640 cm$^{-1}$ that relates to the carbonyl groups, while the band at 1580 cm$^{-1}$ that relates to the C=C bonds [Bao, Q., Zhang, D., & Qi, P., (2011), Synthesis and characterization of silver nanoparticle and graphene oxide nanosheet composites as a bactericidal agent for water disinfection, Journal of Colloid and interface Science, 360 (2), 463-470; Jadav, G., & Singh, P., (2009), Synthesis of novel silica-polyamide nanocomposite membrane with enhanced properties, Journal of Membrane Science, 328 (1-2), 257-267; Saleh, T., & Gupta, V., (2012), Synthesis and characterization of alumina nanoparticles polyamide membrane with enhanced flux rejection performance, Separation And Purification Technology, 89, 245-251].

SEM micrographs show surface morphology of a free surface of the Ag NPs/Polyamide and the Ag NPs/Graphene/Polyamide (as shown in FIG. 4B, 4D, 5A, and 5B). The SEM micrographs indicated that the silver-graphene impeded well within the polyamide. FIG. 1B shows a relative structure of the material, wherein the polyamide bonds two graphene nano-platelets together, and wherein the silver nanoparticles are present on the surface of the graphene (not shown in the SEM micrographs).

EXAMPLE 7

Column System

Figure 7:
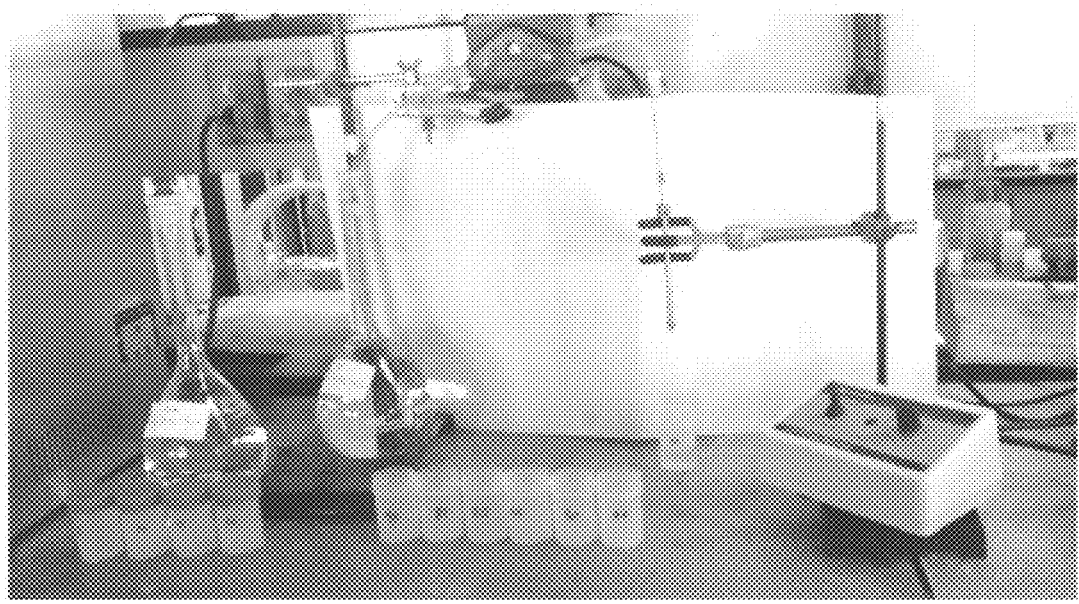
FIG. 7 is a picture of a lab-scale filtration system.

Continuous fixed-bed adsorption experiments were carried out to remove the toxic metals (Hg, Cr, Ni, Pb, Cd) and corresponding cations from an aqueous solution using the produced nanocomposite material. A picture of the experimental set up is shown in FIG. 7. Said nanocomposite material was packed in a column and a solution that contained 1 ppm of each of the following metals, i.e. Hg, Pb, Cr, Cu, Cd, and Ni was pumped to the column to pass through the nanocomposite material and to evaluate the sorption potential of the material. The samples were further collected and analyzed using ICP.

Figure 8:
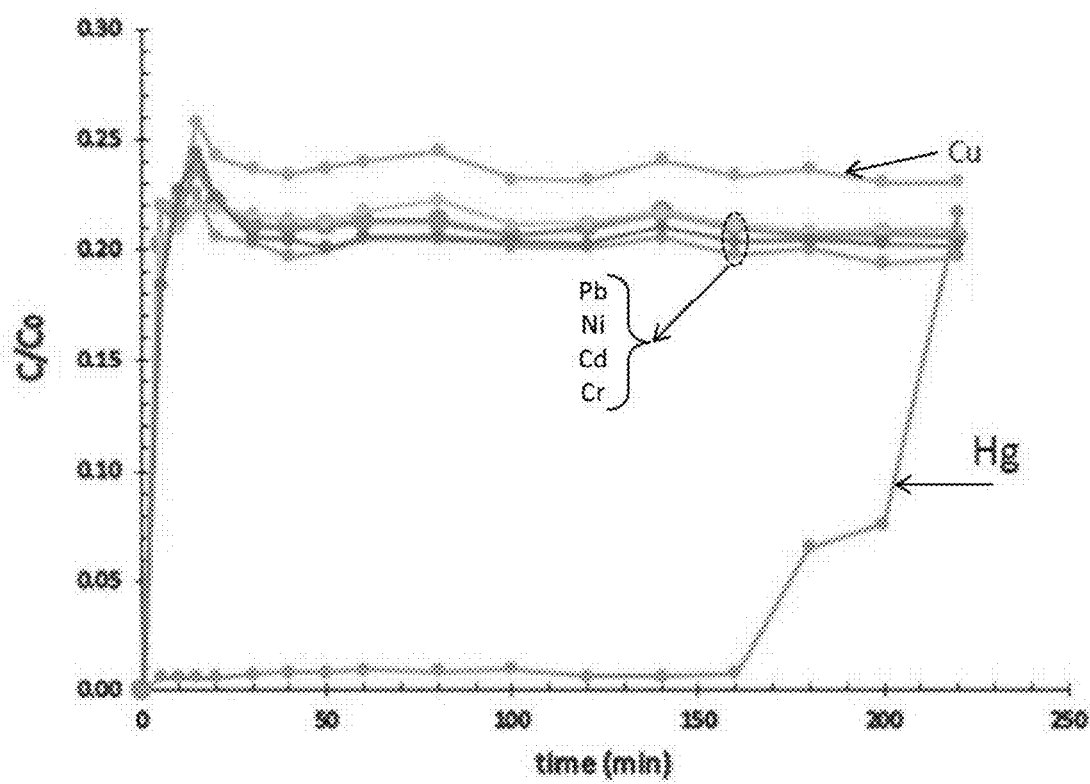
FIG. 8 represents breakthrough curves of selected heavy metals, when a liquid is passed through the filtration system.

The design of the column adsorber involves the calculation of breakthrough curves. In this study, we have optimized the related parameters such as flow rate, bed height, and effect of initial ion concentration on breakthrough curves. FIG. 8 present the breakthrough curves at bed height of about 4 cm and flow rate of around 1 ml/min. The breakthrough results indicated the following order of removal Hg>Cr>Cd>Pb>Ni>Cu. This order implies that the material has more affinity toward adsorption of mercury.

The results from this study showed that Ag NPs and Ag NPs/graphene were synthesized and were incorporated with polyamide via in-situ polymerization reactions. The hybrid materials of silver nanoparticles decorated graphene and polyamide were produced and characterized via various characterization tools. The nanocomposite materials of this disclosure were shown to be promising for water purification systems.

The invention claimed is:

1. A method of reducing a heavy metal content of a liquid containing one or more dissolved metals, comprising:
    passing the liquid through a column packed with particles of a nanocomposite material to adsorb at least a portion of one or more heavy metals onto the nanocomposite material,
    wherein the nanocomposite material comprises:
    a polymer matrix comprising a polyamide: and
    silver-decorated mayhem nano-platelets that are dispersed in the polymer matrix,
    wherein the polvamide comprises reacted units of an aromatic amine and an acyl halide; and
    wherein said one or more heavy metals are at least one selected from the group consisting of mercury, chromium, cadmium, lead, nickel, copper, and cations thereof.

2. The method of claim 1, wherein the liquid is passed through the column packed with the particles of the nanocomposite material in a continuous fashion.

* * * * *